Sept. 20, 1955  V. A. ANDERSON  2,718,284
BRAKE WITH ANCHOR HAVING DIFFERENT WEDGING ANGLES
Filed Jan. 12, 1950  2 Sheets-Sheet 1

INVENTOR.
VERNAL A. ANDERSON
BY
T. J. Plante
ATTORNEY

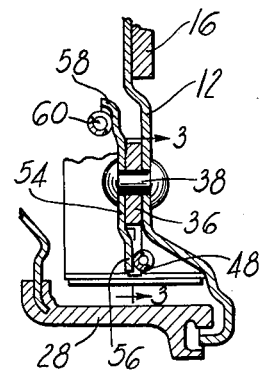
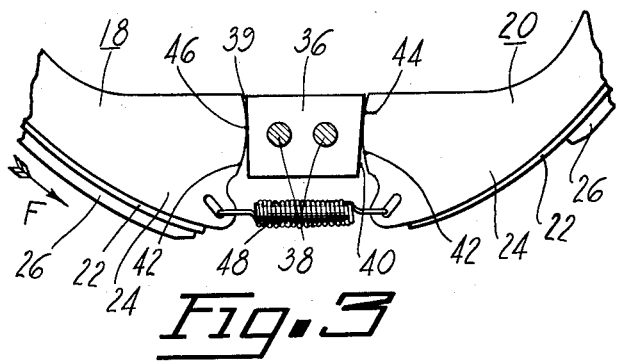
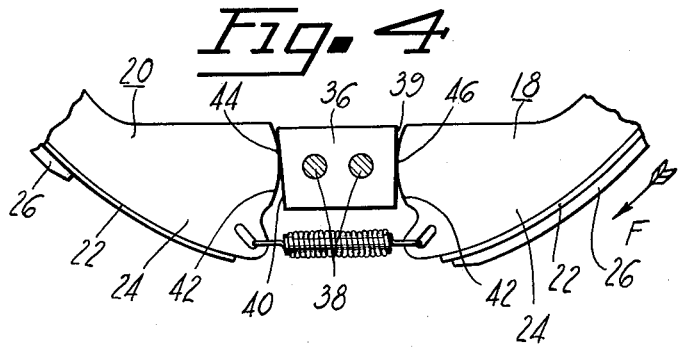

United States Patent Office 2,718,284
Patented Sept. 20, 1955

2,718,284

BRAKE WITH ANCHOR HAVING DIFFERENT WEDGING ANGLES

Vernal A. Anderson, South Bend, Ind., assignor to Bendix Aviation Corporation, South Bend, Ind., a corporation of Delaware Application January 12, 1950, Serial No. 138,229

6 Claims. (Cl. 188—78)

This invention relates to a brake assembly which incorporates a novel shoe-anchoring arrangement. The invention is primarily useful in brakes of the "non-servo" type, i. e. brakes in which only one shoe is self-energizing in each direction of drum rotation.

Vehicle braking systems are being used in which the front wheel brakes are highly effective in forward braking but relatively ineffective in reverse braking. The rear wheel brakes are of the "non-servo" type. In braking systems utilizing such combinations, the brake effectiveness when the vehicle is moving backward is sometimes inadequate, owing to the fact that the major portion of the stopping force must be developed by only two shoes (one in each rear wheel brake) which are self-energizing during rearward drum rotation.

The present invention provides a brake of the "non-servo" type, in which the self-energization factor in one direction of drum rotation is greater than the self-energization factor in the other direction of drum rotation. Thus, the effectiveness of the shoe which is self-energizing when the vehicle is moving backward can be increased relative to the effectiveness of the shoe which is self-energizing when the vehicle is moving forward. At the same time, because speeds are relatively low during backward travel, the increased self-energization of the "effective" shoe in each rear wheel brake will not result in "grabbing."

The anchor arrangement in my improved "non-servo" brake is such that the two shoes used in the brake may be of identical construction (except for the arrangement of the brake lining). This is important because it avoids duplication of the shoe manufacturing dies and tools, and therefore minimizes production costs. Furthermore, the anchor itself is so designed that the identical part may be used in both left wheel and right wheel brakes, the only change being a reversal of the anchor position with respect to the supporting member, or backing plate.

Other objects and advantages of the present invention will become apparent during the following description of an illustrative embodiment of the invention, reference being had therein to the accompanying drawings, in which:

Figure 2 is a sectional view taken on the line 2—2 of Figure 1;

Figure 3 is a view taken on the line 3—3 of Figure 2;

Figure 4 shows an anchor arrangement suitable for a brake used on the opposite side of the vehicle from the brake shown in Figure 1.

Figure 1:
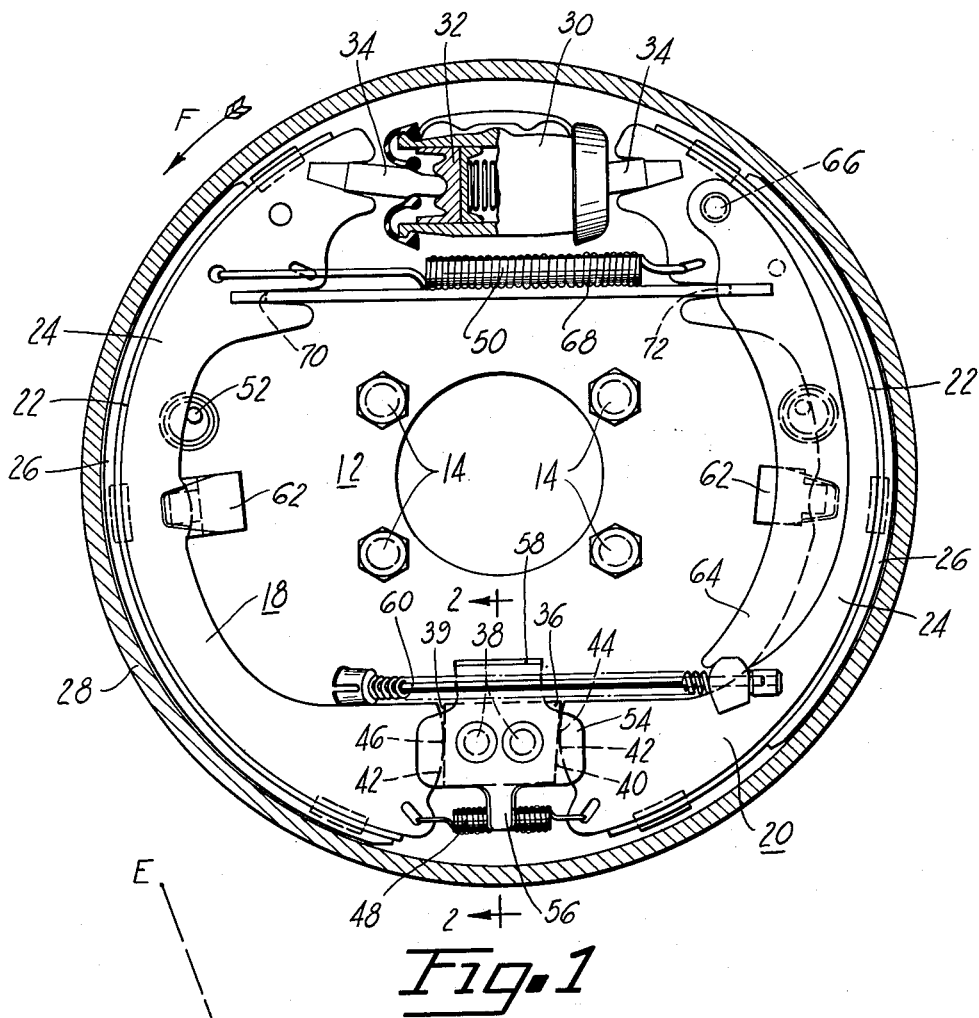
Figure 1 is an elevational view of a brake assembly incorporating my improved anchor arrangement.

The brake assembly shown in Figures 1 to 3 comprises a supporting member, or backing plate, 12 which is secured by a plurality of fastening members 14 to a flange 16 provided on an axle housing (not shown). Two arcuate, T-section brake shoes 18 and 20 are mounted on the backing plate 12. Each shoe comprises a rim 22, a strengthening web 24 perpendicular to the rim, and lining 26 secured to the rim and adapted to engage a rotatable drum 28. The shoes 18 and 20 are preferably identical in all respects, except that the lining segments 26 may vary in composition, length, or location on the shoe rims. Use of identical shoe rims and webs permits the brake to be manufactured at a lower cost than would be possible if the shoe parts were not interchangeable.

The actuator incorporated in the brake assembly is a conventional hydraulic wheel cylinder 30, which is located between the shoes at one side of the brake assembly and which is secured by suitable means to the backing plate. Two pistons 32, which are reciprocably mounted in wheel cylinder 30, are operatively connected to the adjacent ends of the respective shoes by means of thrust members 34.

Figure 5:
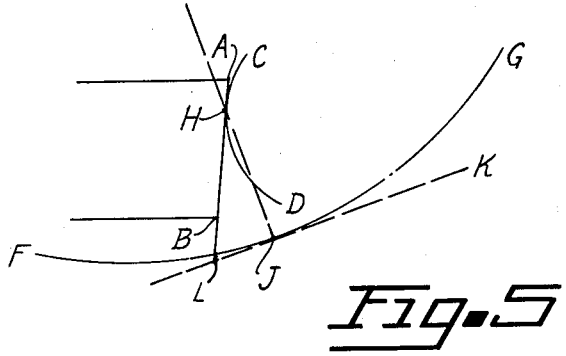
Figure 5 is a diagrammatic illustration of the definition of the term "wedging angle."

An anchor 36 is located between the ends of the shoes remote from the actuator 30. The anchor consists of a flat plate, as shown, the anchor plate being secured to the backing plate by suitable fastening means, such as rivets 38. The tangentially-spaced, shoe-engaging end surfaces 39 and 40 of anchor 36 provide different "wedging angles" for the anchoring ends of the "forward" and "reverse" shoes. The wedging angle (in a brake in which the shoes are able to slide on the anchor surfaces) is the angle formed between a line which constitutes an imaginary outward extension of the anchor surface and a line drawn tangent to the radius of the brake drum which passes through the point of shoe-and-anchor engagement. Figure 5 illustrates the definition diagrammatically. The line A—B represents the anchor surface, C—D outlines the curved end of the shoe, E is the center of the brake assembly and of the circle F—G which constitutes the inner circumference of the drum, and H is the point of engagement of the shoe with the anchor. By drawing the radius EHJ, drawing the tangent JK, and extending AB to intersect JK at L, the angle ALK is formed. Angle ALK is the "wedging angle" of the shoe anchor.

As the wedging angle is made smaller, the self-energization factor of the brake shoe is increased. On the other hand, as the size of the wedging angle is increased, the self-energization factor is reduced. When the wedging angle is 90°, the self-energization due to wedging is zero, and angles greater than 90° have a negative, or reducing, effect on the self-energization of the shoe. In references hereinafter made to wedging angles of different sizes, it is the intention to consider all angles up to 180° as wedging angles, even though their self-energizing effect is zero or negative.

Another design factor which has an effect on the amount of self-energization of the shoe is the distance between the point of anchor engagement and the center of the brake assembly, i. e. the distance E—H in Figure 5. Moving the point H closer to the center E increases the self-energization of the brake shoe, and moving the point H farther from the center reduces the self-energization.

If we assume that the brake assembly disclosed in Figure 1 is installed as the left rear brake on an automobile, the direction of drum rotation when the vehicle is moving forward is indicated by the arrow F. Since increased braking effectiveness during rearward movement of the vehicle is desired, the wedging angle of shoe 20 is made smaller than the wedging angle of shoe 18. In other words, the angle between anchor surface 40 and the tangent to the radius through the point of engagement 44 is smaller than the angle between anchor surface 39 and the tangent to the radius through the point of engagement 46, the point of engagement in each case being the momentary center of rotation of the convexly-curved anchoring end 42 of the shoe web. The difference in the wedging angles is solely a function of the anchor plate contour, and does not prevent the shoe web profiles from being identical (as shown). It will be noted that the difference between the self-energization factors of shoes 18 and 20 is augmented by the fact that the point of engagement 44 is closer to the center of the brake assembly than the point of engagement 46. Owing to the combined effect of the more effective wedging angle and the closer-to-center location of the point of anchor engagement, the self-energizing effect of shoe 20 during rearward braking will be appreciably greater than the self-energizing effect of shoe 18 during forward braking. In designing a brake for a given installation, the arrangement should be such as to provide the maximum permissible self-energization of shoe 18 without "grabbing." The greater self-energization of shoe 20 will not cause any objectionable "grabbing" because of the much lower maximum speed of the vehicle during rearward movement, as compared with forward movement.

My improved shoe-anchoring arrangement provides a differential in the self-energizing effect of the two shoes of a "non-servo" brake, without necessitating the use of differently contoured "forward" and "reverse" shoes. Furthermore, the same anchor plates may be used for both left rear wheel brakes and right rear wheel brakes.

As shown in Figure 4, in which the direction of arrow F corresponds to forward drum rotation, the same anchor plate 36 can be used in the right rear wheel brake by simply turning the plate over and securing the opposite side of the plate to the supporting member.

Referring again to the brake assembly shown in Figure 1, a spring 48 holds the anchoring surfaces 42 of the shoes against the anchor, and another spring 50 is connected to the upper ends of the shoes in order to urge them toward released position, in which they engage the eccentric adjusters 52. A plate 54, separate from anchor plate 36, but secured to the backing plate by the same rivets 38, may be used to: (a) overlie the anchored ends of the shoes and hold them in position laterally, (b) provide an extension 56 which deflects spring 48 to derive a "hold-down" force on the shoes, and (c) provide a ramp 58 for cable 60. Additional hold-down springs 62 engage the shoes near their mid-length points.

Cable 60 is connected to the lower end of a lever 64, which is pivotally connected by pin 66 to the web of shoe 20. A thrust link 68 engages shoe 18 at 70 and engages lever 64 at 72 to provide, with the lever and cable, a mechanical actuating device which spreads the shoes when the emergency (or parking brake) lever in the driver's compartment is operated.

When the upper ends of the shoes are spread either mechanically or hydraulically, the lower ends 42 of the shoe webs roll slightly on anchor surfaces 39 and 40, until the shoe linings engage the drum. If either shoe is not exactly concentric with the drum at the time of engagement, one part of the shoe will engage the drum first, and the shoe will slide with respect to anchor 36 until it is concentric with the drum. This "self-centering" action of the shoes ensures full lining engagement, and prevents loss of effectiveness due to localized engagement at the heel of the shoe, or "grabbing" due to localized engagement at the toe of the shoe.

Although a particular embodiment of my invention has been described, it will be understood by those skilled in the art that the objects of the invention may be attained by the use of constructions different in certain respects from that disclosed, without departing from the underlying principles of the invention.

I claim:

1. For use in cooperation with a rotatable drum, a brake comprising a non-rotatable supporting member, two arcuate T-section brake shoes mounted on the supporting member and each comprising a rim and a web, the webs of the two shoes having identical profiles including convexly-curved anchoring surfaces, an actuator which is carried by the supporting plate at one side of the brake and which is operatively connected to the adjacent ends of the shoes, and an anchor plate secured to the supporting member and located between the ends of the shoes remote from the actuator, said anchor plate having tangentially spaced straight end surfaces which are engaged by the anchoring ends of the shoe webs and which possess a smaller wedging angle for the shoe which is self-energizing during rearward rotation of the drum than for the shoe which is self-energizing during forward rotation of the drum, both ends of both shoes being displaceable radially relative to the actuator and anchor plate, respectively, to permit longitudinal self-centering movement of the shoes in the drum.

2. A brake comprising a non-rotatable supporting member, two arcuate T-section brake shoes mounted on the supporting member and each comprising a rim and a web, the webs of the two shoes having identical profiles including convexly-curved anchoring surfaces, an actuator which is carried by the supporting plate at one side of the brake and which is operatively connected to the adjacent ends of the shoes, and an anchor plate secured to the supporting member and located between the ends of the shoes remote from the actuator, said anchor plate having tangentially-spaced straight end surfaces which are engaged by the anchoring ends of the shoe webs said end surfaces extending in nonparallel directions which possess with respect to the "reverse" and "forward" shoes different wedging angles.

3. A brake comprising a non-rotatable supporting member, two substantially identical brake shoes mounted on the supporting member and each comprising a rim and a web, an actuator which is located at one side of the brake and which is operatively connected to the adjacent ends of the shoes, and an anchor plate secured to the supporting member and located between the ends of the shoes remote from the actuator, said anchor plate having shoe-engaging end surfaces which possess different wedging angles for the "forward" and "reverse" shoes, the anchoring ends of the shoe webs engaging the respective end surfaces of the anchor plate at radially spaced points.

4. A brake assembly comprising a non-rotatable supporting member, two substantially identical brake shoes mounted on the supporting member, an actuator which is operatively connected to one end of each shoe at one side of the brake, and an anchor on the supporting member between the ends of the shoes remote from the actuator, said anchor having shoe-engaging surfaces which possess different wedging angles for the "forward" and "reverse" shoes.

5. A brake assembly comprising a non-rotatable supporting member, two brake shoes mounted on the supporting member, an actuator which is operatively connected to one end of each shoe at one side of the brake, and an anchor on the supporting member between the ends of the shoes remote from the actuator, said anchor possessing shoe-engaging surfaces which have different wedging angles for the "forward" and "reverse" shoes.

6. In a brake assembly having a non-rotatable supporting member and two brake shoes mounted on the supporting member, an anchor plate secured to the supporting member and located between the shoes at one side of the brake assembly, said anchor plate having straight shoe-engaging end surfaces which possess different wedging angles for the "forward" and "reverse" shoes.

References Cited in the file of this patent

UNITED STATES PATENTS

| | | |
|---|---|---|
| 1,727,717 | Kelley | Sept. 10, 1929 |
| 1,851,737 | Stoner | Mar. 29, 1932 |
| 1,878,911 | Stoner | Sept. 20, 1932 |
| 1,954,530 | La Brie | Apr. 10, 1934 |
| 2,208,293 | Hayes et al. | July 16, 1940 |
| 2,431,441 | Willis | Nov. 25, 1947 |
| 2,509,643 | House | May 30, 1950 |
| 2,544,030 | House | Mar. 6, 1951 |